United States Patent
Burchett et al.

(10) Patent No.: US 9,160,535 B2
(45) Date of Patent: Oct. 13, 2015

(54) TRULY ANONYMOUS CLOUD KEY BROKER

(71) Applicant: Dell Inc, Round Rock, TX (US)

(72) Inventors: Christopher Burchett, Lewisville, TX (US); Warren Robbins, Celina, TX (US); Richard E Phillips, Lewisville, TX (US)

(73) Assignee: Dell Inc, Round Rock, TX (US)

( * ) Notice: Subject to any disclaimer, the term of this patent is extended or adjusted under 35 U.S.C. 154(b) by 389 days.

(21) Appl. No.: 13/847,395

(22) Filed: Mar. 19, 2013

(65) Prior Publication Data

US 2013/0305054 A1  Nov. 14, 2013

Related U.S. Application Data

(60) Provisional application No. 61/612,810, filed on Mar. 19, 2012.

(51) Int. Cl.
*H04L 29/06* (2006.01)
*H04L 9/32* (2006.01)
*H04L 9/08* (2006.01)

(52) U.S. Cl.
CPC ............ *H04L 9/3213* (2013.01); *H04L 9/0827* (2013.01); *H04L 9/0894* (2013.01); *H04L 63/00* (2013.01); *H04L 2209/42* (2013.01)

(58) Field of Classification Search
CPC ... H04L 9/3213; H04L 9/0827; H04L 9/0894; H04L 63/00; H04L 2209/42
See application file for complete search history.

(56) References Cited

U.S. PATENT DOCUMENTS

| | | | |
|---|---|---|---|
| 8,843,997 B1* | 9/2014 | Hare | 726/3 |
| 2005/0257264 A1* | 11/2005 | Stolfo et al. | 726/23 |
| 2006/0155985 A1* | 7/2006 | Canard et al. | 713/156 |
| 2007/0005962 A1* | 1/2007 | Baker | 713/168 |
| 2010/0174911 A1* | 7/2010 | Isshiki | 713/182 |
| 2013/0036476 A1* | 2/2013 | Roever et al. | 726/27 |
| 2014/0059693 A1* | 2/2014 | Stecher | 726/26 |

* cited by examiner

*Primary Examiner* — Chau Le
(74) *Attorney, Agent, or Firm* — Fogarty, L.L.C.

(57) ABSTRACT

Embodiments of systems and methods for providing anonymous cloud encryption are provided. One embodiment of a method for providing anonymous cloud encryption includes communicating an anonymizing token to a key broker. Additionally, the method may include communicating at least one encryption key associated with the anonymizing token to the key broker. The method may also include conducting a secure anonymous transaction with a cloud service using at least one of the encryption keys associated with the anonymizing token.

14 Claims, 14 Drawing Sheets

TRULY ANONYMOUS CLOUD KEY BROKER

CROSS-REFERENCE TO RELATED APPLICATIONS

This application claims priority to U.S. provisional patent application Ser. No. 61/612,810 entitled "Truly Anonymous Cloud Key Broker," filed on Mar. 19, 2012, the entirety of which is incorporated herein by reference.

TECHNICAL FIELD

This specification relates generally to cloud-based technologies, and, more particularly, to methods, systems, and services for truly anonymous cloud key broker.

BACKGROUND

Current trends in the computer industry are leading to increasingly distributed systems. Computer users may now have access to a variety of computer platforms in a given day. For example, many computer users have a desktop computer for home use. Some users may also have a laptop computer for use at school or work. Additionally, some users may have access to tablet computers for mobile computing. Additionally, a computer user may have access to a mobile computing device, such as a smartphone with mobile computing capabilities. It is quite common that a computer user would own several of these devices for home or personal use.

In addition, it is common for a computer user to access a whole different set of computing devices at school or work. Each set of computing devices may have access to different networks. For example, the user's personal devices may have access to his home or public network, but not to his work network. Similarly, school networks may be secured, and restrict access to personal devices. Unfortunately, the computer user is often restricted from taking computing devices from work or school to his home. Therefore, the computer user may have access to several computing devices during a single day, but those computing devices may not be easily transportable or accessible outside of a given network. Thus, a computer user's computing experience may be fragmented or compartmentalized based on their current location.

Discrete access to computing devices, files, folders, and applications can be a disadvantage. For example, many computer users wish to access work documents and applications at home. Similarly, computer users often wish to access home files, such as music and other media files, while at work. In a culture where the lines between home and work are often blurred, it is a disadvantage to have discrete access to computing resources.

Computer users may also wish to collaborate with others to jointly develop a project. For example, co-workers may wish to collaborate on a document or presentation. Software development teams may wish to collaborate to develop software code and applications. Many other examples exist. It can be difficult to collaborate with a co-worker, particularly when the co-worker is located in a remote office or location. Collaboration is further complicated when document security is a concern.

In the past, computer users have often transported files and folders between computing devices using storage disks, such as flash memory drives, floppy disks, portable hard drive devices, etc. Portable data storage may not be optimal because some storage devices may be incompatible with some computing devices, portable storage devices may become lost or broken, and many companies are restricting access to foreign data storage devices for security protection.

Cloud resources have recently developed as a viable solution, thus computer systems are becoming more distributed. For example, a cloud resource could include cloud storage for storing data files and folders, cloud servers for hosting cloud-based applications, cloud access to peripheral resources such as computers and scanners, and other cloud-based objects, both hardware and software. Security is a concern for cloud resources, and consequently, a computer user's actions on a cloud resource are typically tracked and logged.

SUMMARY

Embodiments of systems and methods for providing anonymous cloud encryption are provided. Additionally, embodiments of cloud encryption services and reseller systems are described. The present embodiments may be implemented in hardware, software-configured hardware, or software stored on computer readable media.

One embodiment of a method for providing anonymous cloud encryption includes communicating an anonymizing token to a key broker. Additionally, the method may include communicating at least one encryption key associated with the anonymizing token to the key broker. The method may also include conducting a secure anonymous transaction with a cloud service using at least one of the encryption keys associated with the anonymizing token.

In one embodiment, conducting a secure anonymous transaction further comprises storing data on a cloud storage facility, the data being encrypted using a data encryption key, the data encryption key being associated with the anonymizing token.

The method may also include enabling a collaborator to access the cloud service, in one embodiment. The collaborator may be configured to communicate a second anonymizing token to the key broker. The collaborator may also communicate at least one encryption key associated with the second anonymizing token to the key broker. Additionally, the collaborator may conduct a secure anonymous transaction with a cloud service using at least one of the encryption keys associated with the second anonymizing token. In such an embodiment, the method may further include communicating a collaboration token between the key broker, the client, and the collaborator, communicating at least one collaboration key between the key broker, the client, and the collaborator, the at least one collaboration key being associated with the collaboration token, and facilitating collaboration in one or more secure anonymous transactions with the cloud service using the at least one collaboration key associated with the collaboration token.

In an embodiment, the method includes recovering the anonymizing token from the key broker, the anonymizing token being recovered using decryption information which is not stored on the key broker. The method may further include recovering the at least one encryption key from the key broker, the at least one encryption key being recovered using decryption information which is not stored on the key broker.

The method may additionally include deduplicating redundant data associated with the cloud service, wherein redundancy of the data is determined, at least in part, in response to the anonymyzing token.

The method may also include communicating, to the key broker, one or more audit keys for the secure anonymous transaction, the one or more audit keys being associated with the anonymizing token. In one embodiment, the audit key may be used for verification of data communicated with the cloud service, or to verify one or more transactions with the cloud service, including encryption of data and other communications with the cloud service.

In another embodiment, a method may include receiving an anonymizing token from a client, generating a record associated with the anonymizing token, receiving one or more encryption keys associated with the anonymizing token, and storing the one or more encryption keys in the record associated with the anonymizing token.

In an embodiment, the method includes generating one or more encryption keys and associating the one or more encryption keys with the anonymizing token in the record associated with the anonymizing token.

The method may also include enabling a collaborator to access the cloud service. For example, such an embodiment may include receiving a second anonymizing token from a second client. Also, the method may include generating a second record associated with the second anonymizing token. In an embodiment, the method includes receiving at least one encryption key associated with the second anonymizing token from the second client. Additionally, the method may include storing the one or more encryption keys associated with the second anonymizing token in the second record. Also, the method may include facilitating communication of one or more collaboration keys from the first client to the second client. In such an embodiment, the method may further include communicating a collaboration token between the key broker, the client, and the collaborator, communicating at least one collaboration key between the key broker, the client, and the collaborator, the at least one collaboration key being associated with the collaboration token, and facilitating collaboration in one or more secure anonymous transactions with the cloud service using the at least one collaboration key associated with the collaboration token.

In one embodiment, this method may include providing recovery services to the client for recovering the anonymizing token, the anonymizing token being recovered using decryption information which is not stored on the key broker. The method may further include providing recovery services to the client for recovering the at least one encryption key from the key broker, the at least one encryption key being recovered using decryption information which is not stored on the key broker.

In an embodiment, the method includes deduplicating redundant data associated with the cloud service, wherein redundancy of the data is determined, at least in part, in response to the anonymyzing token.

This method may also include receiving one or more audit keys for the secure anonymous transaction, and storing the one or more audit keys in association with the anonymizing token.

Embodiments of a system are also described. In an embodiment, the system includes a data processing device. The data processing device may be configured to receive an anonymizing token from a client, generate a record associated with the anonymizing token, receive one or more encryption keys associated with the anonymizing token, and store the one or more encryption keys in the record associated with the anonymizing token.

An embodiment of a service reseller system is also provided. In such an embodiment, the reseller system may be configured to receive an anonymizing token from a client. The reseller system may also be configured to communicate an anonymizing token to a key broker. Additionally, the reseller system may receive one or more encryption keys associated with the anonymizing token. In an embodiment, the reseller system may communicate at least one encryption key associated with the anonymizing token to the key broker. The reseller system may be configured to facilitate a secure anonymous transaction with a cloud service using at least one of the encryption keys associated with the anonymizing token.

Embodiments of a reseller service are also provided. In one embodiment the reseller service comprises receive an anonymizing token from a client, communicating an anonymizing token to a key broker; receiving one or more encryption keys associated with the anonymizing token, communicating at least one encryption key associated with the anonymizing token to the key broker, and facilitating a secure anonymous transaction with a cloud service using at least one of the encryption keys associated with the anonymizing token.

Embodiments of a tangible computer-readable medium are presented. The tangible computer-readable medium may include computer-executable code that, when executed by a data processing device, causes data processing device to perform operations corresponding to one or more of the embodiments of a method described herein.

BRIEF DESCRIPTION OF THE DRAWINGS

Figure 1:
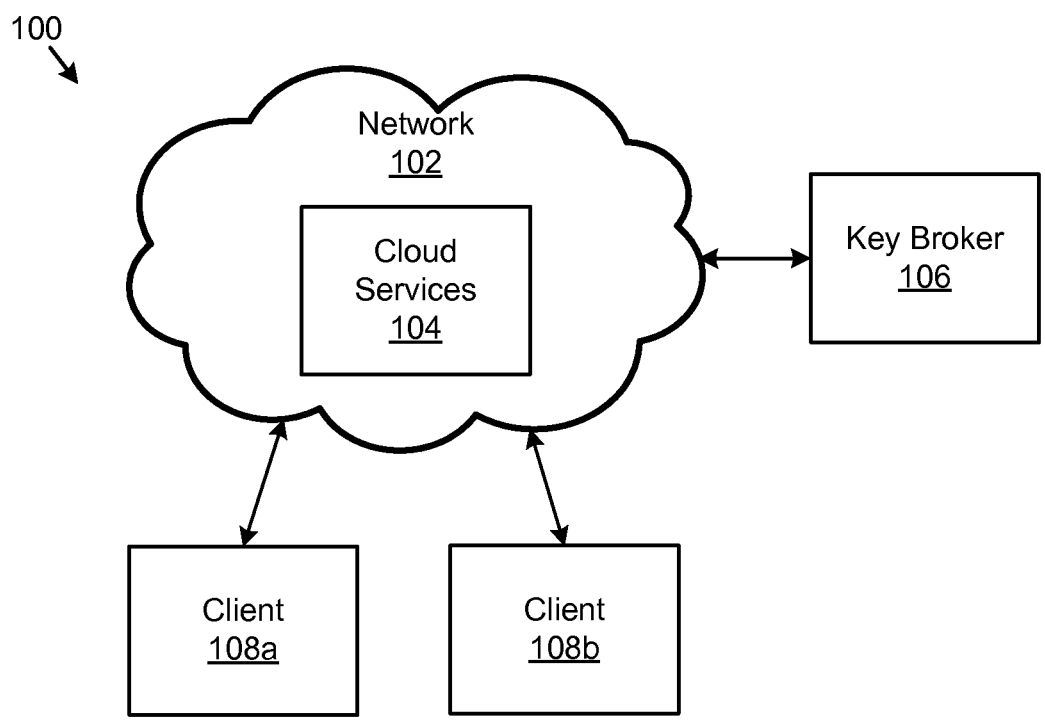

Having thus described the invention in general terms, reference will now be made to the accompanying drawings, which are not necessarily drawn to scale, and wherein:

FIG. 1 is a schematic block diagram illustrating one embodiment of a system for providing anonymous security for a transaction with a cloud service.

Figure 2:
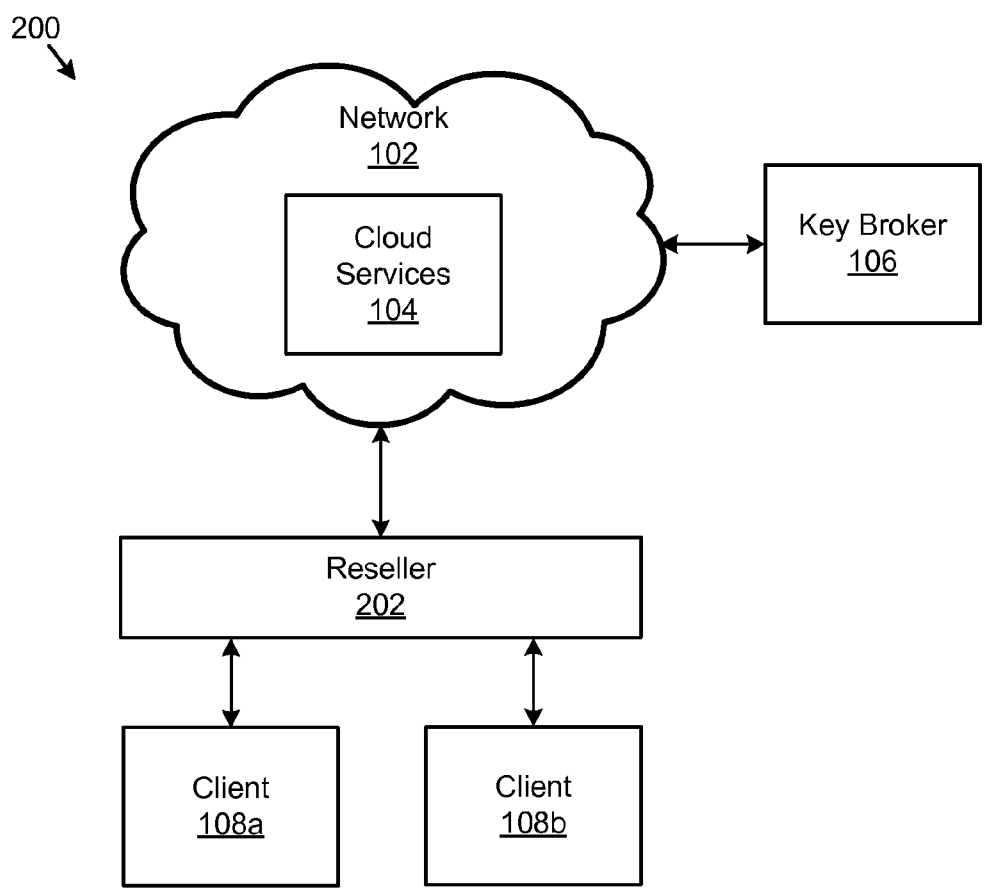

FIG. 2 is a schematic block diagram illustrating one embodiment of a service reseller system for providing anonymous security for a transaction with a cloud service.

Figure 3:
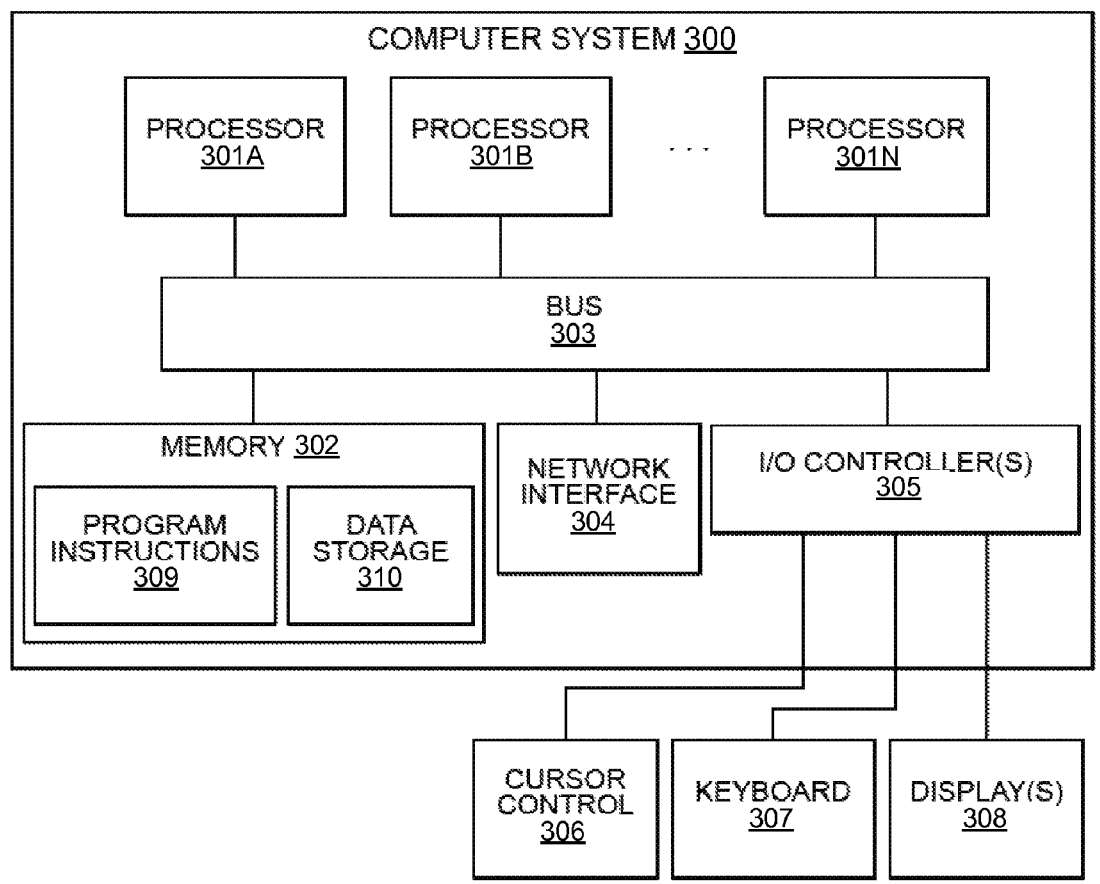

FIG. 3 is a schematic block diagram illustrating one embodiment of a computer system configurable for providing anonymous security for a transaction with a cloud service.

Figure 4:
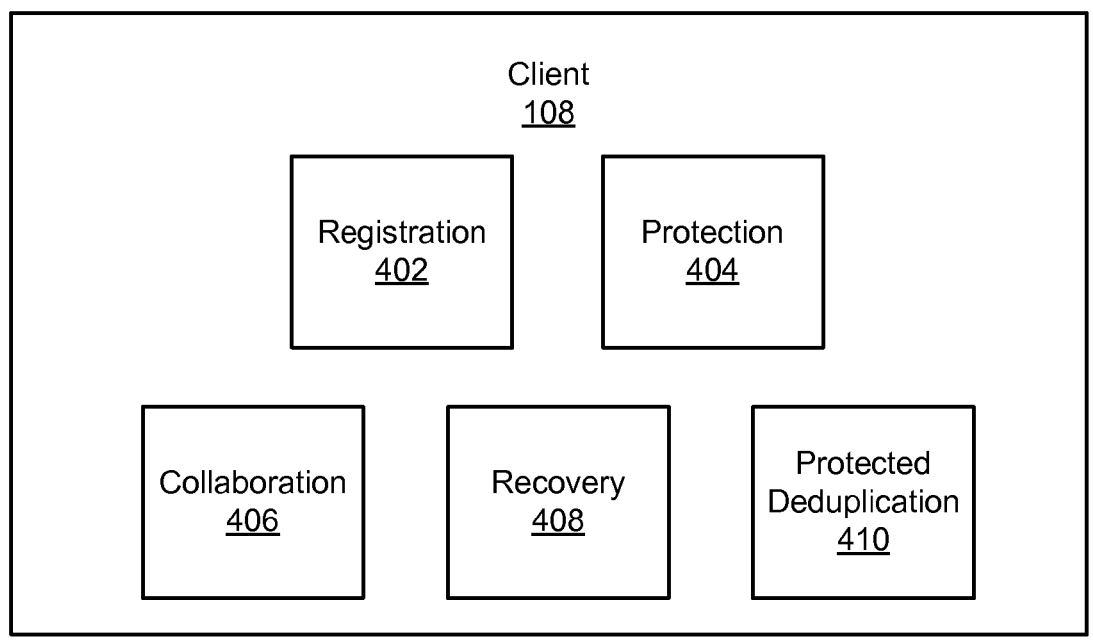

FIG. 4 is a schematic block diagram illustrating one embodiment of an apparatus for providing anonymous security for a transaction with a cloud service.

Figure 5:
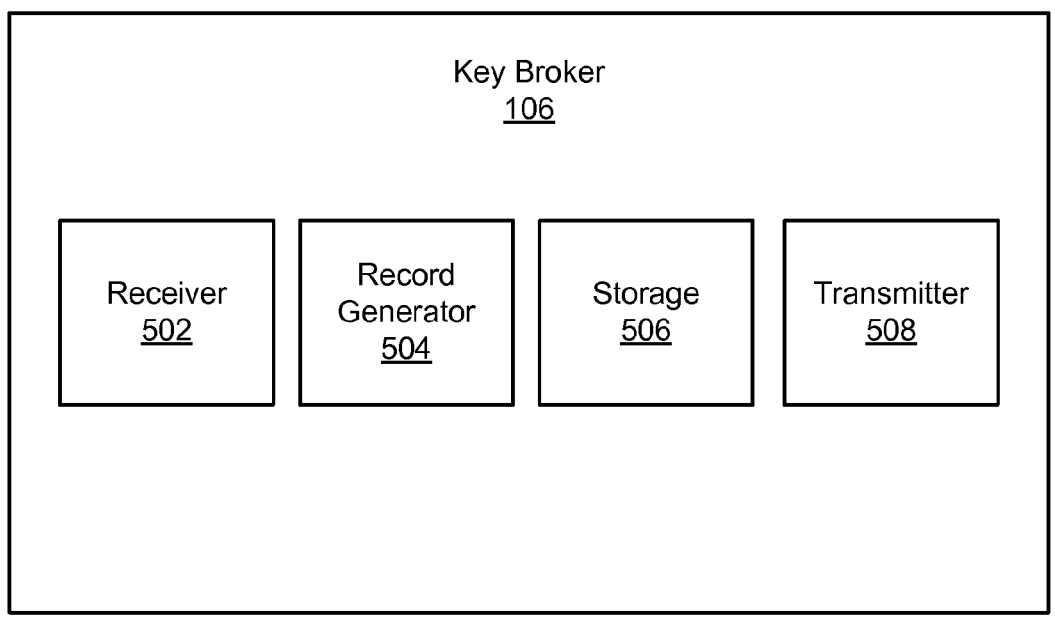

FIG. 5 is a schematic block diagram illustrating another embodiment of an apparatus for providing anonymous security for a transaction with a cloud service.

Figure 6:
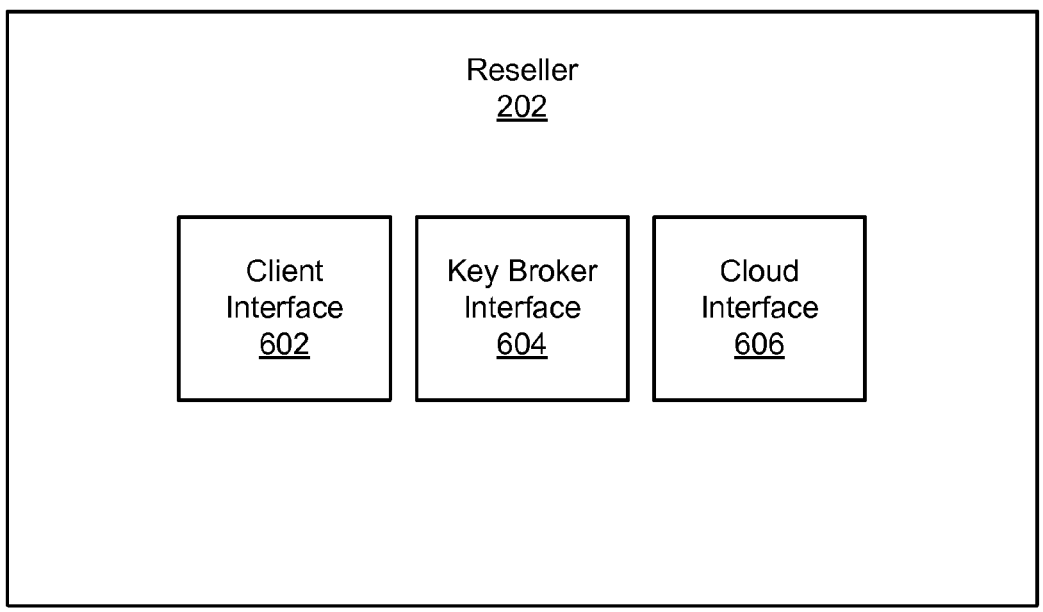

FIG. 6 is a schematic block diagram illustrating one embodiment of an apparatus for resale of services for providing anonymous security for a transaction with a cloud service.

Figure 7:
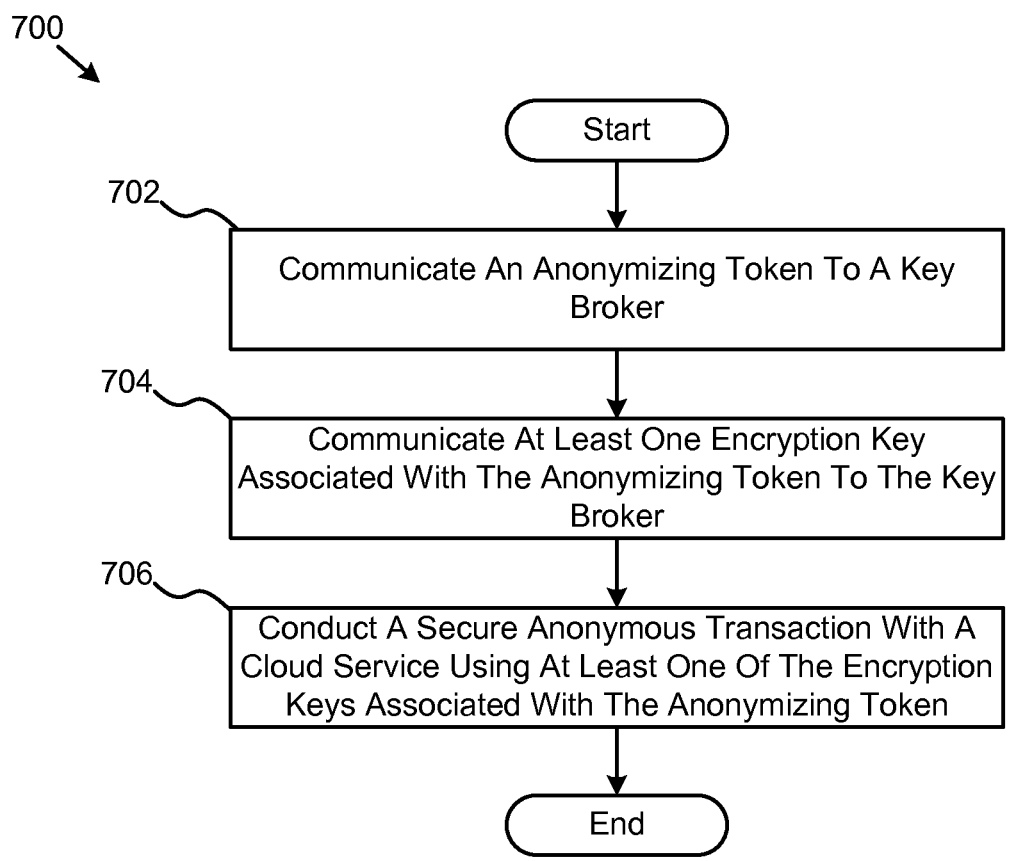

FIG. 7 is a schematic flowchart diagram illustrating one embodiment of a method for providing anonymous security for a transaction with a cloud service.

Figure 8:
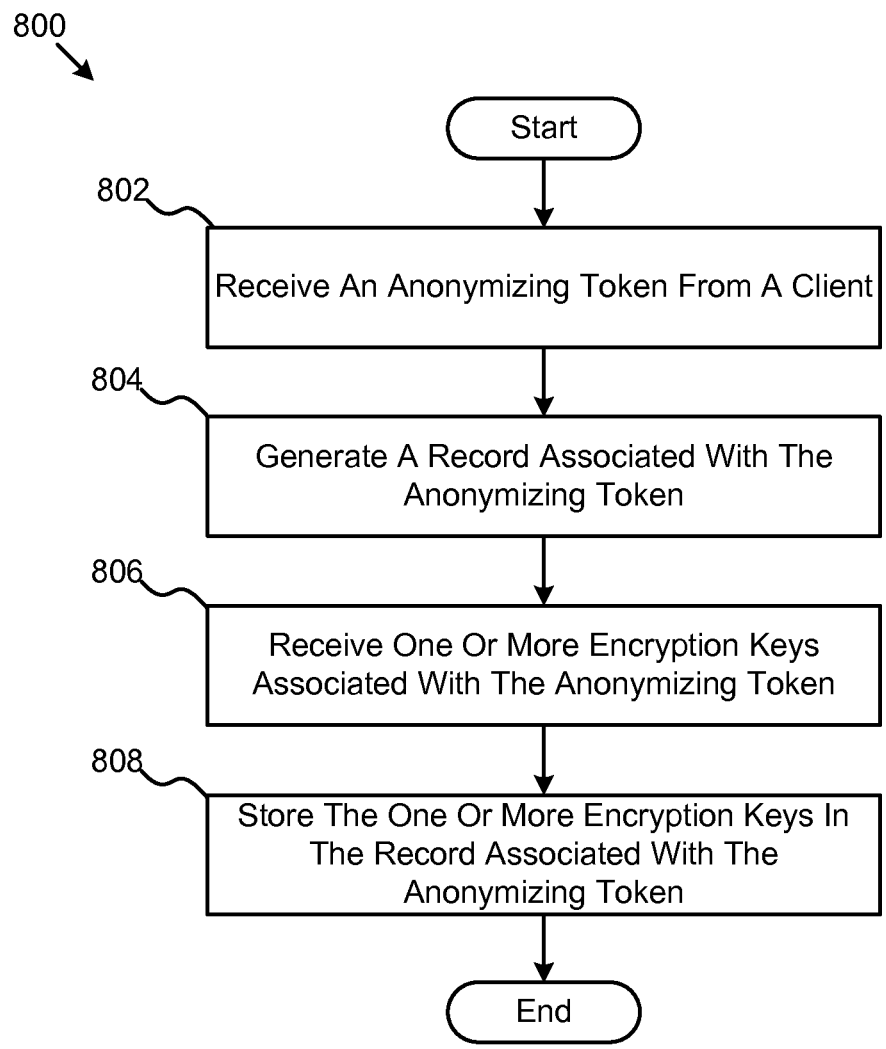

FIG. 8 is a schematic flowchart diagram illustrating another embodiment of a method for providing anonymous security for a transaction with a cloud service.

Figure 9:
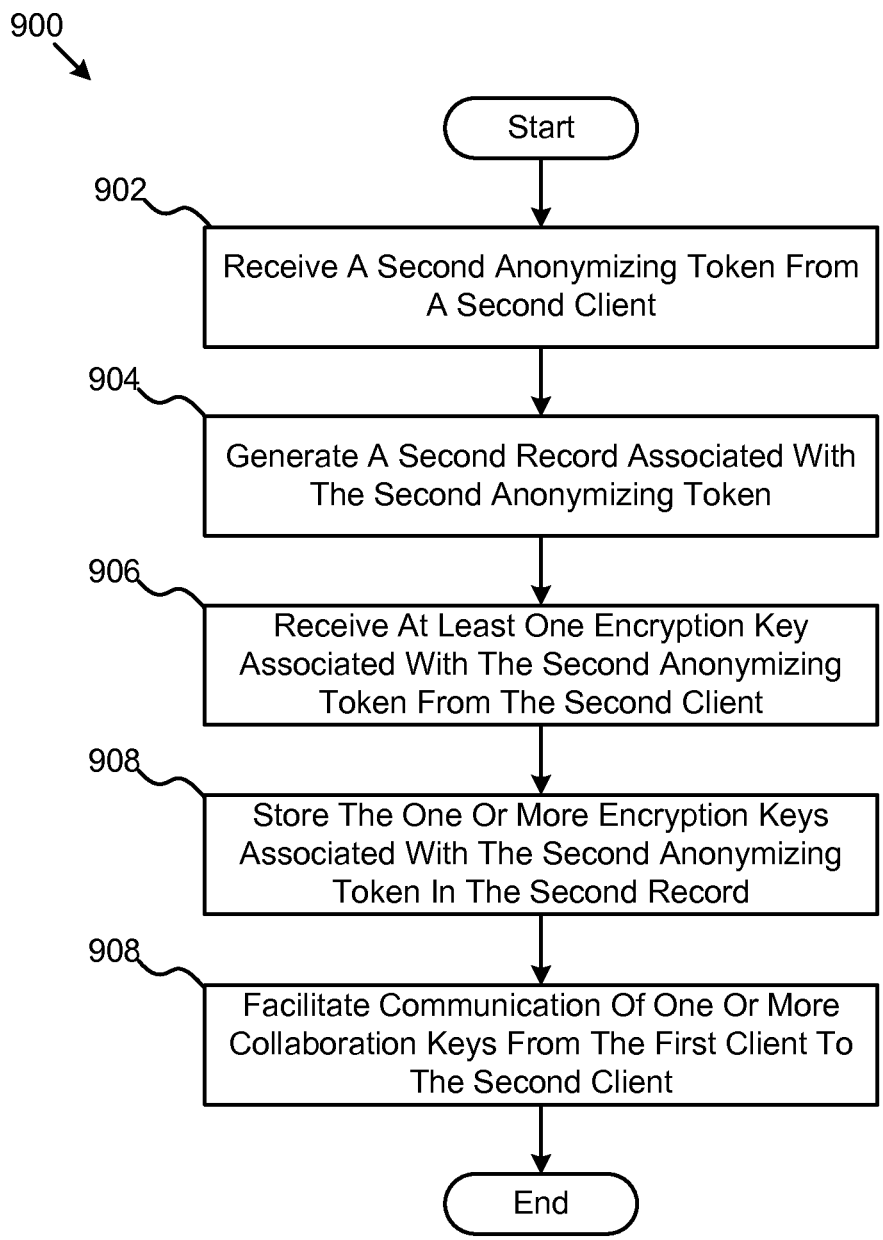

FIG. 9 is a schematic block diagram illustrating one embodiment of a service for providing anonymous security for a transaction with a cloud service.

Figure 10:
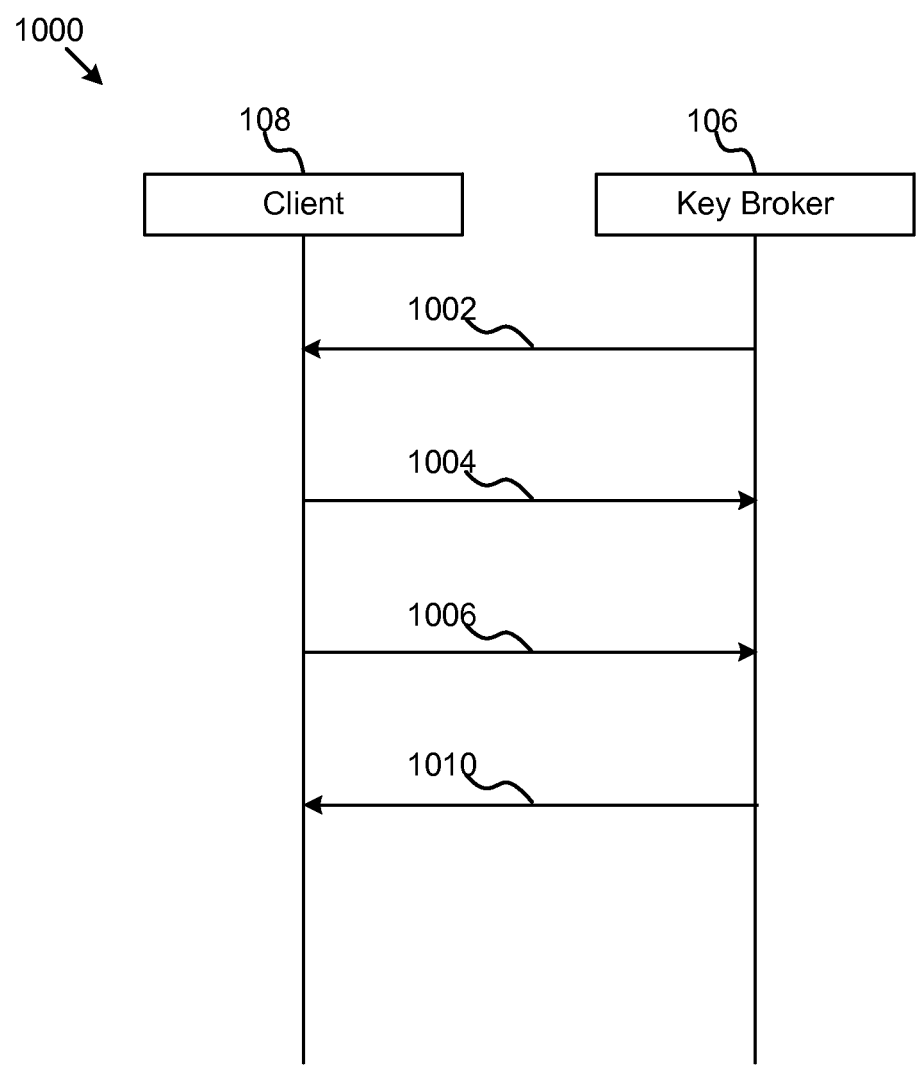

FIG. 10 is a schematic transaction flow diagram illustrating one embodiment of a method for registering with an anonymous security system for a transaction with a cloud service.

Figure 11:
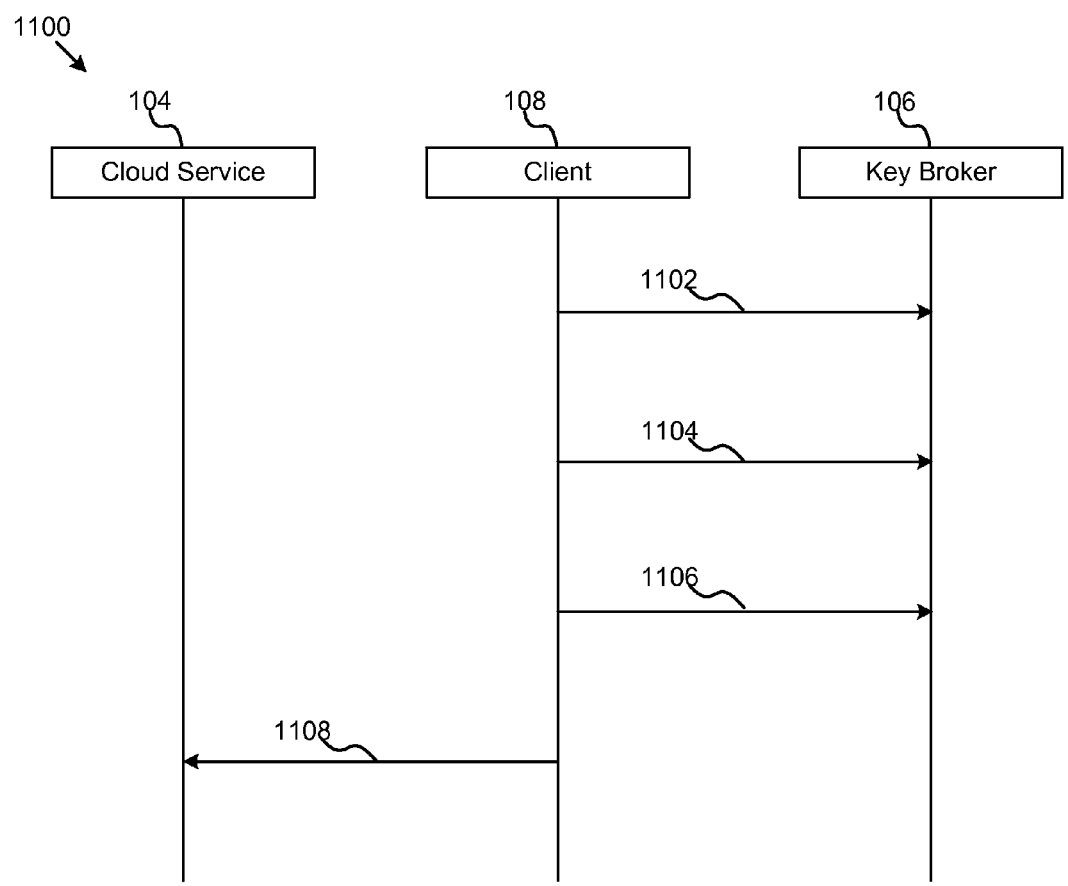

FIG. 11 is a schematic transaction flow diagram illustrating one embodiment of a method for conducting an anonymous and secure transaction with a cloud service.

Figure 12:
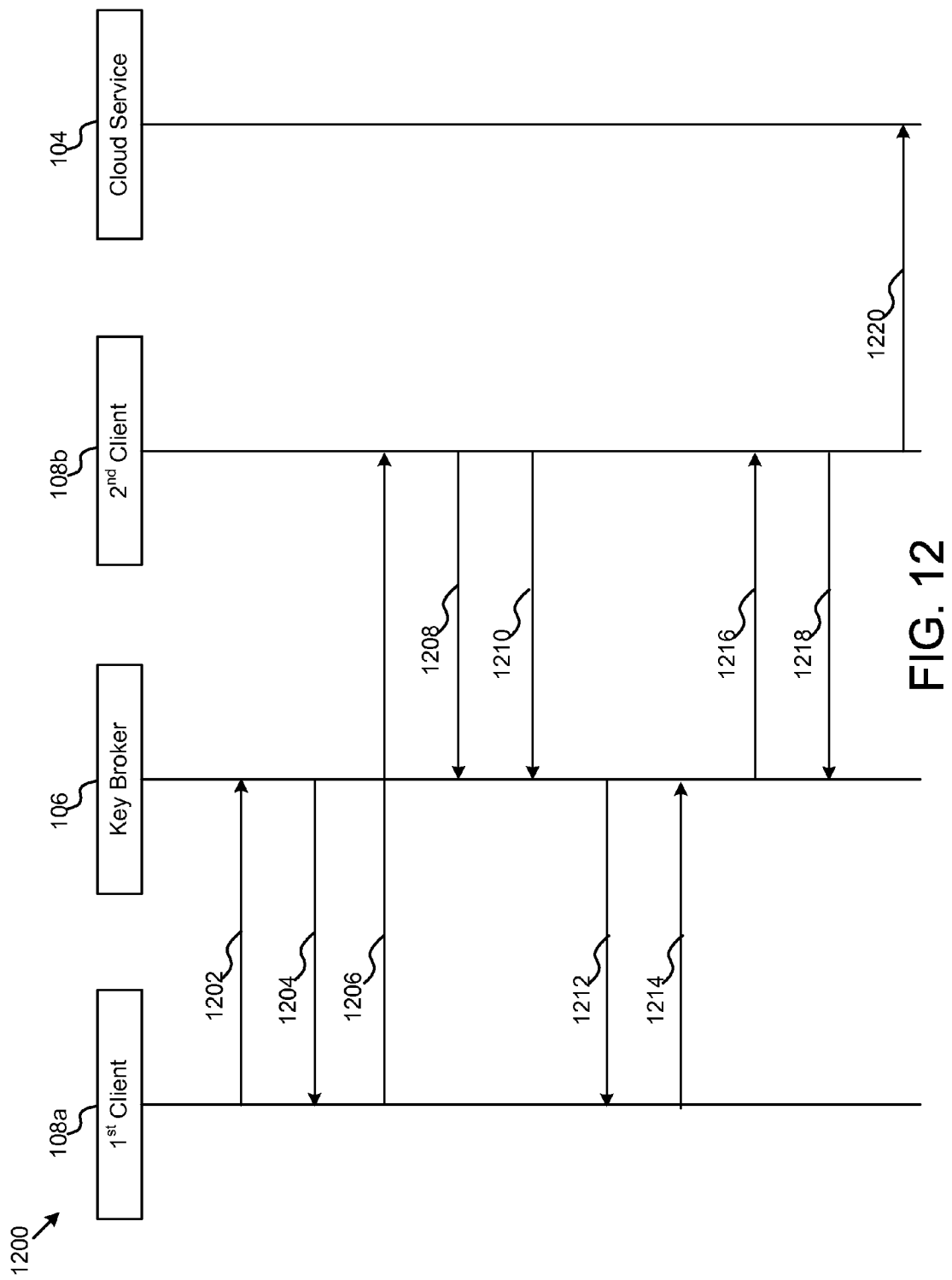

FIG. 12 is a schematic transaction flow diagram illustrating one embodiment of a method for collaborating in an anonymous and secure transaction with a cloud service.

Figure 13:
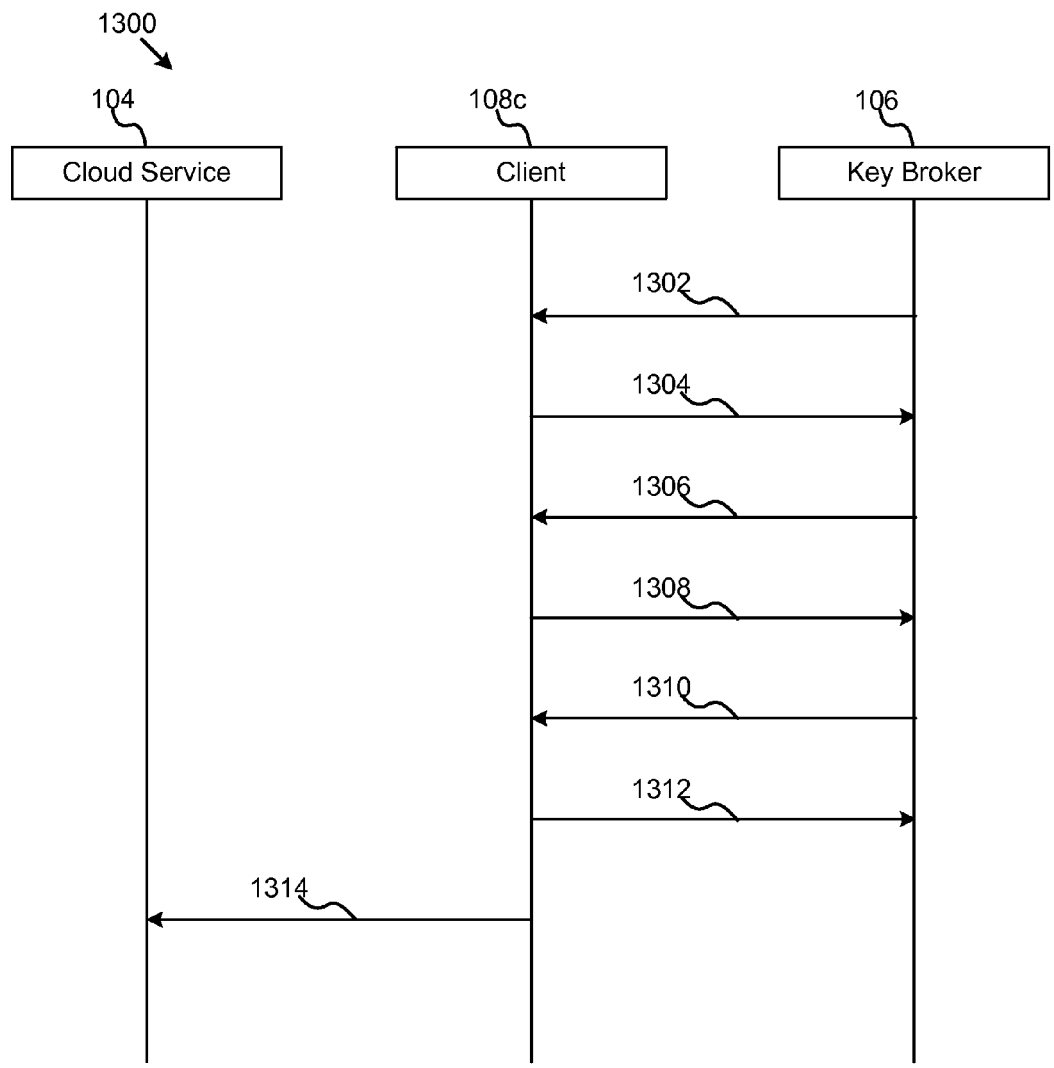

FIG. 13 is a schematic transaction diagram illustrating one embodiment of a method for recovery of a system for providing anonymous security for a transaction with a cloud service.

Figure 14:
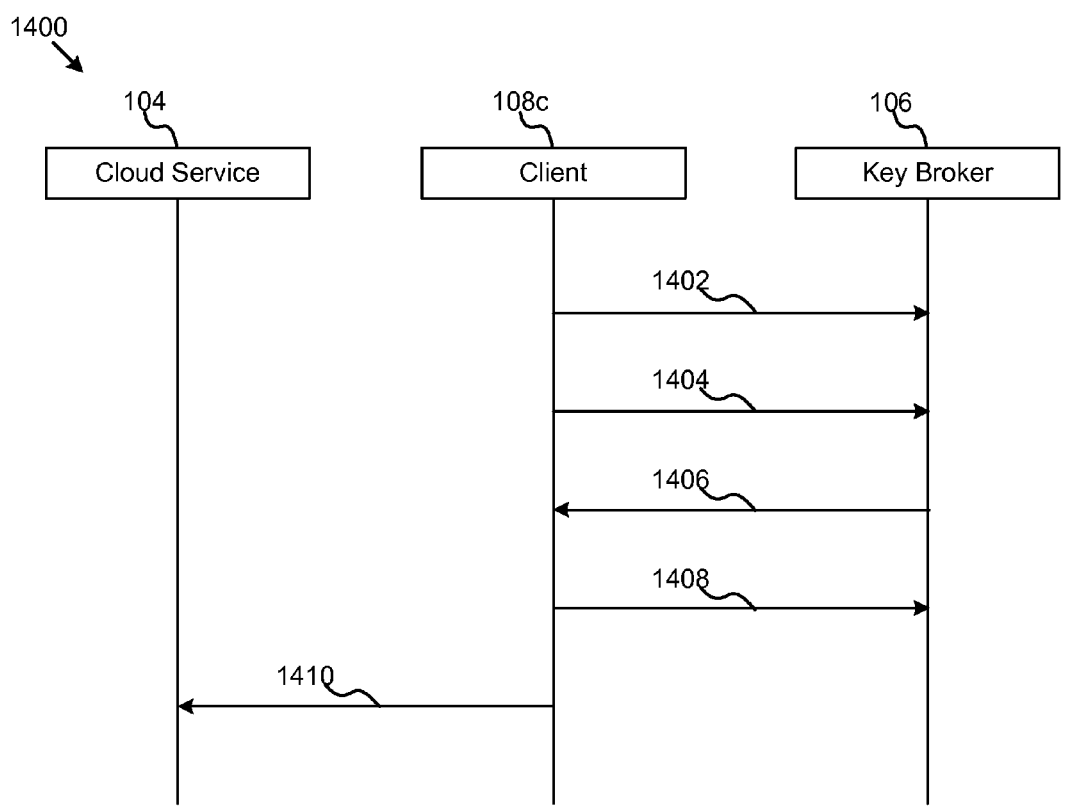

FIG. 14 is a schematic transaction diagram illustrating one embodiment of a method for data deduplication in a system having anonymous security for a transaction with a cloud service.

DETAILED DESCRIPTION

FIG. 1 is a schematic block diagram illustrating one embodiment of a system 100 for providing anonymous security for a transaction with a cloud service 104. In the depicted embodiment, the system 100 includes a network 102. The network may provide connectivity to one or more cloud services 104. Additionally, the system 100 may include a key broker 106 for facilitating the anonymous security in the transaction with the cloud service 104. The system 100 may also include one or more clients 108. For example, the in the examples described herein, Alice may be a user of the first client 108a and Bob may be the user of the second client 108b.

In an embodiment, the system 100 may be configured such that the clients 108a,b may anonymously conduct transactions with the cloud service 104. In a further embodiment, the data and/or communications between the client 108 and the cloud service 104 may be encrypted. In still a further embodiment, the system 100 may be configured such that the relationship between the client 108 and the transaction conducted on the cloud service 104 cannot be deduced. In still further embodiments, the system 100 may be configured to allow the first client 108a and the second client 108b to collaborate in the cloud service 104, but the relationship between the first client 108a and the second client 108b or the cloud service 104 cannot be deduced. In still a further embodiment, the relationship between the clients and the cloud service may not even be deduced by the key broker 106 or from any information stored on the key broker 106. Thus, the key broker 106 may facilitate encryption of data, communications, or transactions on the cloud service 104, but the anonymity of the client 108 may be protected.

In one embodiment, network 102 may include the Internet. Alternatively, network 102 may include a public or private cloud services interconnection network. The network 102 may include various network traffic handling devices, including routers, switches, data security devices, firewalls, quality of service controllers, network interface devices, or the like. These devices may be configured to facilitate communications between the clients 108, the cloud services 104, and the key broker 106.

The cloud services 104 may include various network-accessible distributed systems or services. For example, cloud services 104 may include cloud storage services for storing data files in the cloud. In another embodiment, cloud services 104 may include access to cloud-based servers or other virtual machines. In still further embodiments, cloud services 104 may include cloud accessible printing services. Other cloud services 104 may include Software as a Service (SaaS) for providing cloud-based applications. One of ordinary skill in the art may recognize additional cloud services 104 that may be used in combination with the present embodiments.

Clients 108 may include a user's computer, such as a desktop, laptop, tablet, or the like. In one embodiment, the user's computer may not be considered a client 108 until a client software object is installed on the computer. The clients 108 provide the user with access to the network 102 as well as to cloud services 104 and key broker 106. On of ordinary skill in the art will recognize various embodiments of clients that may be suitable for use with the present embodiments. Further embodiments of clients 108 are described in FIGS. 3-4 and the related description.

The key broker 106 may be a data security service provider. The key broker 106 may be accessible through network 102. Alternatively, key broker 106 may be accessible through another network, or may even be directly connected to clients 108a,b. Key broker 106 may be a standalone device. Alternatively, key broker 106 may be incorporated into one or more components of network 102. In still a further embodiment, key broker 106 may be incorporated into one or more components of cloud services 104. Embodiments of key broker 106 are discussed in FIGS. 3 and 5 and related description.

FIG. 2 is a schematic block diagram illustrating one embodiment of a service reseller system 200 for providing anonymous security for a transaction with a cloud service 104. In addition to the elements of the system 200 described above with relation to FIG. 1, the embodiment of FIG. 2 includes a services reseller system 202. In one embodiment, the reseller system 202 may include servers, routers, switches, and other hardware devices for interfacing with the network 102, including cloud services 104 and key broker 106. Additionally, the reseller system 202 may include interfaces for communicating with one or more clients 108. In a particular embodiment, reseller system 202 may include one or more Application Program Interfaces (APIs) for receiving network-based requests for cloud services 104 and/or access to key broker 106 from clients 108. In one embodiment, reseller system 202 may offer access to both cloud services 104 and key broker 106 to clients 108. Alternatively, reseller system 202 may only offer access to one of either the cloud services 104 or the key broker 106. Further embodiments of reseller system 202 are discussed in FIGS. 3 and 6 and related description.

FIG. 3 is a schematic block diagram illustrating one embodiment of a computer system 300 configurable for providing anonymous security for a transaction with a cloud service. In one embodiment, clients 108 may be implemented on a computer system similar to the computer system 300 described in FIG. 3. Similarly, key broker 106 may be implemented on a computer system similar to the computer system 300 described in FIG. 3. Reseller system 202 may also be implemented on a computer system similar to the computer system 300. In various embodiments, computer system 300 may be a server, a mainframe computer system, a workstation, a network computer, a desktop computer, a laptop, or the like.

As illustrated, computer system 300 includes one or more processors 301A-N coupled to a system memory 302 via bus 303. Computer system 300 further includes network interface 304 coupled to bus 303, and input/output (I/O) controller(s) 305, coupled to devices such as cursor control device 306, keyboard 307, and display(s) 308. In some embodiments, a given entity (e.g., client 108, or key broker 106) may be implemented using a single instance of computer system 300, while in other embodiments multiple such systems, or multiple nodes making up computer system 300, may be configured to host different portions or instances of embodiments (e.g., in cloud services 104).

In various embodiments, computer system 300 may be a single-processor system including one processor 301A, or a multi-processor system including two or more processors 301A-N (e.g., two, four, eight, or another suitable number). Processor(s) 301A-N may be any processor capable of executing program instructions. For example, in various embodiments, processor(s) 301A-N may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processor (s) 301A-N may commonly, but not necessarily, implement the same ISA. Also, in some embodiments, at least one processor(s) 301A-N may be a graphics processing unit (GPU) or other dedicated graphics-rendering device.

System memory 302 may be configured to store program instructions and/or data accessible by processor(s) 301A-N. For example, memory 302 may be used to store software program 300 and/or database 306 shown in FIG. 3. In various embodiments, system memory 302 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described above, may be stored within system memory 302 as program instructions 309 and data storage 310, respectively. In other embodiments, program instructions and/or data may be received, sent or stored upon different types of computer-accessible media or on similar media separate from system memory 302 or computer system 300. Generally speaking, a computer-accessible medium may include any tangible, non-transitory storage media or memory media such as electronic, magnetic, or optical media—e.g., disk or CD/DVD-ROM coupled to computer system 300 via bus 303, or non-volatile memory storage (e.g., "flash" memory)

The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 303 may be configured to coordinate I/O traffic between processor 301, system memory 302, and any peripheral devices including network interface 304 or other peripheral interfaces, connected via I/O controller(s) 305. In some embodiments, bus 303 may perform any necessary protocol, timing or other data transformations to convert data signals from one component (e.g., system memory 302) into a format suitable for use by another component (e.g., processor(s) 301A-N). In some embodiments, bus 303 may include support for devices attached through various types of peripheral buses, such as a variant of the Peripheral Component Interconnect (PCI) bus standard or the Universal Serial Bus (USB) standard, for example. In some embodiments, the operations of bus 303 may be split into two or more separate components, such as a north bridge and a south bridge, for example. In addition, in some embodiments some or all of the operations of bus 303, such as an interface to system memory 302, may be incorporated directly into processor(s) 301A-N.

Network interface 304 may be configured to allow data to be exchanged between computer system 300 and other devices, such as other computer systems attached to network 103, or devices 203-1 through 203-4 in FIG. 2, for example. In various embodiments, network interface 304 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

I/O controller(s) 305 may, in some embodiments, enable connection to one or more display terminals, keyboards, keypads, touch screens, scanning devices, voice or optical recognition devices, or any other devices suitable for entering or retrieving data by one or more computer system 300. Multiple input/output devices may be present in computer system 300 or may be distributed on various nodes of computer system 300. In some embodiments, similar I/O devices may be separate from computer system 300 and may interact with computer system 300 through a wired or wireless connection, such as over network interface 304.

As shown in FIG. 3, memory 302 may include program instructions 309, configured to implement certain embodiments described herein, and data storage 310, comprising various data accessible by program instructions 309. In an embodiment, program instructions 309 may include software elements of embodiments illustrated in FIG. 3. For example, program instructions 309 may be implemented in various embodiments using any desired programming language, scripting language, or combination of programming languages and/or scripting languages. Data storage 310 may include data that may be used in these embodiments such as, for example, database 306. In other embodiments, other or different software elements and data may be included.

A person of ordinary skill in the art will appreciate that computer system 300 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations.

Embodiments of clients 108, key broker 106, and reseller system 202 described in FIGS. 4-6 below may be implemented in a computer system that is similar to computer system 300. In one embodiment, the elements described in FIG. 4-6 may be implemented in discrete hardware modules. Alternatively, the elements may be implemented in software-defined modules which are executable by one or more of processors 301A-N, for example.

FIG. 4 is a schematic block diagram illustrating one embodiment of a client 108 configured for providing anonymous security for a transaction with a cloud service 104. In one embodiment, client 108 may include one or more modules or units. The modules or units may be hardware-defined circuits, software-defined processor modules, or a combination of hardware and software. Specifically, client 108 may include a registration module 402, a protection module 404, a collaboration module 406, a recovery module 408, and a protected deduplication module 410. In one embodiment, these modules may be defined in separate or discrete components or objects of client 108. Alternatively, the modules may be integrated into, for example, a single executable software application. In one embodiment, the client 108 may be generally configured to receive an anonymizing token from a client, generate a record associated with the anonymizing token, receive one or more encryption keys associated with the anonymizing token, and store the one or more encryption keys in the record associated with the anonymizing token.

In one embodiment, the registration may be configured to establish a user account for accessing the key broker 106. An embodiment of a method for registering is described in further detail with relation to FIG. 10.

The protection module 404 may be configured to generate and handle encryption keys associated with the anonymizing token for encrypting or otherwise protecting data and/or communications with the cloud service 104. In one embodiment, conducting a secure anonymous transaction further comprises storing data on a cloud storage facility, the data being encrypted using a data encryption key, the data encryption key being associated with the anonymizing token. Further embodiments of methods that may be performed by protection module are described below with reference to FIG. 11.

The collaboration module 406 may be configured to enable a collaborator to access the cloud service 104. In one embodiment, the first client 108*a* may be configured to collaborate with a collaborator (e.g., client 108*b*) in transactions with the cloud service 104. The collaborator 108*b* may be configured to communicate a second anonymizing token to the key broker 106. The collaborator 108*b* may also communicate at least one encryption key associated with the second anonymizing token to the key broker 106. Additionally, the collaborator 108*b* may conduct a secure anonymous transaction with a cloud service 104 using at least one of the encryption keys associated with the second anonymizing token. In such an embodiment, the collaboration module 406 may be further configured to communicate a collaboration token between the key broker 106, the client 108*a*, and the collaborator 108*b*. The collaboration module 406 may also communicate at least one collaboration key between the key broker 106, the client 108*a*, and the collaborator 108*b*. In an embodiment, the at least one collaboration key is associated with the collaboration token. Additionally, the collaboration module 406 may be configured to facilitate collaboration in one or more secure anonymous transactions with the cloud service 104 using the at least one collaboration key associated with the collaboration token.

In one embodiment, the recovery module 408 may be configured to recover the anonymizing token from the key broker 106. The anonymizing token may be recovered using decryption information which is not stored on the key broker 106. For example, the root key, which is known only to the client 108 may be used to recover the anonymizing token. Additionally, the recovery module may be configured to recover the at least one encryption key from the key broker 106, the at least one encryption key being recovered using decryption information which is not stored on the key broker 106.

The protected deduplication module 410 may be configured to deduplicate redundant data associated with the cloud service 104. In one embodiment, protecting redundant data associated with the cloud service 104 may be performed in a way that protected data can be deduplicated. In an embodiment, the redundancy of the data is determined, at least in part, in response to the anonymizing token. In another embodiment, the collaboration token may be used to identify redundant data. In still further embodiments, audit keys associated with either the anonymizing token or the collaboration token may be used to identify redundant data.

FIG. 5 is a schematic block diagram illustrating another embodiment of a key broker 106 for providing anonymous security for a transaction with a cloud service. In an embodiment, the key broker 106 may be a repository for one or more encryption keys used for conducting an anonymous secure transaction with cloud service 104. In a further embodiment, the identity of the client 108 may be hidden from the cloud service 104 and the key broker through use of an anonymizing token. In an embodiment, the key broker 106 may include a receiver 502, a record generator 504, a storage module 506, and a transmitter 508.

The receiver module 502 may be configured to receive login credentials and registration information associated with a user of the key broker 106. Additionally, the receiver module 502 may be configured to receive an anonymizing token from a client 108. In still a further embodiment, the receiver module 502 may be configured to receive one or more data encryption keys, data audit keys, and other keys and communications that may facilitate operation of the system 100.

In one embodiment, record generator 504 may be configured to receive one or more encryption keys from the receiver module 502 and associated the one or more encryption keys with the anonymizing token. The keys may be stored by the storage module 506 in association with the anonymizing token. In another embodiment, the record generator 504 may be configured to generate one or more encryption keys and associating the one or more encryption keys with the anonymizing token in the record associated with the anonymizing token. For example, the record generator 504 may generate a public encryption key for use by the client in transactions.

In a particular embodiment, the record generator 504 may be configured to store a record of a collaboration token and one or more collaboration keys enabling a collaborator 108*b* to access the cloud service 104. For example, the receiver module 502 may be configured to receive a second anonymizing token from a second client 108*b*. Also, the record generator 504 may be configured to generate a second record associated with the second anonymizing token. In an embodiment, the receiving module 502 is configured to receive at least one encryption key associated with the second anonymizing token from the second client. Additionally, the storage module 506 may be configured to store the one or more encryption keys associated with the second anonymizing token in the second record. The transmitter 508 may be configured to facilitate communication of one or more collaboration keys from the first client 108*a* to the second client 108*b*. In such an embodiment, the transmitter module 508 may further communicate a collaboration token between the key broker 106, the client 108*a*, and the collaborator 108*b*. The transmitter may also communicate at least one collaboration key between the key broker 106, the client 108*a*, and the collaborator 108*b*, the at least one collaboration key being associated with the collaboration token by the record generator 504, and facilitating collaboration in one or more secure anonymous transactions with the cloud service 104 using the at least one collaboration key associated with the collaboration token.

In one embodiment, the transmitter 508 may also provide recovery services to the client 108 for recovering the anonymizing token, the anonymizing token being recovered using decryption information which is not stored on the key broker 106. The transmitter 508 may also provide recovery services to the client 108 for recovering the at least one encryption key from the key broker, the at least one encryption key being recovered using decryption information which is not stored on the key broker.

FIG. 6 is a schematic block diagram illustrating one embodiment of a reseller system 202 configured for resale of services for providing anonymous security for a transaction with a cloud service 104. In such an embodiment, the reseller system 202 may be configured to receive an anonymizing token from a client 108 over a client interface 602. The reseller system 202 may also be configured to communicate the anonymizing token to a key broker 106 over the key broker interface 604. One of ordinary skill in the art will recognize that various communications in the reverse direction may take place, including transfer of recovery tokens, etc. Additionally, the reseller system 202 may receive one or more encryption keys associated with the anonymizing token over either the client interface 602 or the key broker interface 604 depending upon the direction of communication. In an embodiment, the reseller system 202 may communicate at least one encryption key associated with the anonymizing token to the key broker 604 over the key broker interface 604. The reseller system 202 may also include a cloud interface 606 configured to facilitate a secure anonymous transaction with a cloud service 104 using at least one of the encryption keys associated with the anonymizing token. One of ordinary skill in the art will recognize additional services that may be provided by reseller system 202 including billing, provision of reporting, monitoring, and the like.

FIG. 7 is a schematic flowchart diagram illustrating one embodiment of a method 700 for providing anonymous security for a transaction with a cloud service. In one embodiment the method 700 is carried out by the client 108. The method may start when the client 108 communicates 702 an anonymizing token to a key broker 106. Additionally, the method 700 may include the client 108 communicating 704 at least one encryption key associated with the anonymizing token to the key broker 106. The method 700 may also include conducting 706 a secure anonymous transaction with a cloud service 104 using at least one of the encryption keys associated with the anonymizing token.

The method 700 may also include communicating, to the key broker 106, one or more audit keys for the secure anonymous transaction, the one or more audit keys being associated with the anonymizing token. In one embodiment, the audit key may be used for verification of data communicated with the cloud service, or to verify one or more transactions with the cloud service, including encryption of data and other communications with the cloud service.

FIG. 8 is a schematic flowchart diagram illustrating another embodiment of a method 800 for providing anonymous security for a transaction with a cloud service 104. This embodiment of a method 800 may be carried out by a key broker 106. In an embodiment, the method 800 may start when the receiver module 502 receives 802 an anonymizing token from a client 108. The record generator 504 may then generate 804 a record associated with the anonymizing token. The receiver 502 may also receive 806 one or more encryption keys associated with the anonymizing token. The storage module 506 may store 808 the one or more encryption keys in the record associated with the anonymizing token. Embodiments of this method 800 may also include receiving one or more audit keys for the secure anonymous transaction, and storing the one or more audit keys in association with the anonymizing token.

FIG. 9 is a schematic block diagram illustrating one embodiment of a service 900 for providing anonymous security for a transaction with a cloud service. Embodiments of the service 900 may be carried out by the reseller system 202. In one embodiment the reseller system 202 is configured to receive 902 an anonymizing token from a client 106. The reseller system 202 may then communicate 904 the anonymizing token to a key broker 106. Additionally, the reseller system 202 may receive 906 one or more encryption keys associated with the anonymizing token. The reseller system 202 may then communicate 908 at least one encryption key associated with the anonymizing token to the key broker 106. Finally, the reseller system 202 may facilitate 910 a secure anonymous transaction with a cloud service 104 using at least one of the encryption keys associated with the anonymizing token.

One particular example, involving fictional characters Alice, Bob, Webster, and Mallory and their fictional interactions over a system arranged according the present embodiments is discussed throughout the following description. This non-limiting example is included to assist the reader in understanding the various embodiments presented herein, and is not intended to further limit the scope of the present embodiments in any way. The example is merely intended for the purpose of improving the readability of the disclosure.

In this example, Alice and Bob would like to collaborate on a project together. As a part of the project, they wish to store data in a public storage location, such as on a cloud storage service 104, that both can access from any device they wish to use at any time. Alice and Bob wish to monitor each other's progress with updates from each other each time they continue to work on the project. They also wish to keep their project data and even the fact that they are working on this together private so that Mallory cannot see the data or the amount of work being done. Alice and Bob do not know how to use cryptography to do this for themselves, so they ask Webster to help them but they do not want even Webster to be able to see their data or monitor their access. Webster agrees to provide a service that Alice and Bob can use to encrypt their data and monitor each other's access of the data without the possibility for Mallory (or even Webster for that matter) to access the data or the monitoring information produced for Alice and Bob.

Beneficially, Alice and Bob can collaborate on shared data stored in any public storage location and monitor each other's activity using a service provided by Webster that enables them to collaborate securely without Webster being able to disclose who Alice and Bob are or what they are doing—even if required to do so by law enforcement. In further embodiments, Webster may also provide a service for allowing Bob and Alice to collaborate on duplicated files that are also encrypted but with some reduction in anonymity.

In the following examples, Alice may be a user of client 108a, Bob may be a user of client 108b, Webster may be the key broker 106 and Mallory may represent a malware attack, police or government surveillance, or some other undesired third party.

FIG. 10 is a schematic transaction flow diagram illustrating one embodiment of a method 1000 for registering with an anonymous security system for a transaction with a cloud service 104. In one embodiment, Alice registers with Webster's 106 service to create an account which can be used to access keys. For example, Alice may download the Webster's client software onto PC1 108a and enters her email Alice@yahoo.com and a password. In one embodiment, the actions performed below that are done by Alice's PC 108a are performed by Webster's client running on Alice's PC 108a. In other embodiments, the actions are performed by other mechanisms such as, but not limited to, a third-party software client, a built-in operating system routine, or custom software written by Alice.

Webster's service may create an account record to store Alice's email and encrypted info, for example with record generator 504. Alice's PC 108 may create one or more tokens keys, stores the tokens or keys locally, and sends 1004 it to Webster's service on key broker 106 for storage with her email for account access recovery. An embodiment of a key generated by the client 108a is a symmetric root key (RootA) that is stored in Alice's record encrypted by the hash of Alice's password plus salt (E[RootA]password+clientSalt).

In one embodiment, it may be assumed that a checksum or CRC info is included for all stored encrypted keys so the system can automatically determine success or failure of opening the keys. In other embodiments, no CRC or checksum is included. In still other embodiments, different mechanisms are used to determine success or failure of opening the keys. One or more Recovery key(s) based on a hash of info known to Alice for password recovery purposes (personal question answers) may also be generated, stored, and sent to key broker (for example {E[RootA]recovery+clientS all}).

In addition, Alice's PC 106 may email the clientSalt to Alice@yahoo.com for future recovery needs. In such an embodiment, RootA is not open on Webster's service. This is why the service login key exists to confirm the identity of the user and why clientSalt is used to protect the RootA in addition to the password. For ease of use the password and question answers may be the same for the root key and the login key.

A symmetric service login key (LoginA) that is stored in Alice's record encrypted by the hash of Alice's password plus salt (E[LoginA]password) may also be sent at transaction 1004. The LoginA key may be used to allow Webster to verify Alice's identity when logging into Webster's service. In one embodiment, LoginA key may be created on Webster's service either in addition, or in the alternative. One or more Recovery key(s) based on a hash of info known to Alice for password recovery purposes (personal question answers) {E[LoginA]recovery} may also be transmitted to key broker 106 at transaction 1004.

At transaction 1006, Alice's PC 108a creates and sends an anonymizing token for Alice (TokA), that is not stored or logged or in any way associated with Alice's user account, to Webster's service for safe keeping. Webster's service may create a new Token Record for TokA, in record generator 504 for example. Alice may also send E[TokA]RootA which is stored and associated with Alice's user account.

At transaction 1008, Alice's PC 108a creates a private key stored only on her PC 108a, PC1 (PrivTokA-PC1). Webster's service may receive the corresponding public key (PubTokA-PC1) for TokA and stores it associated with TokA.

At transaction 1010, Webster's service may then create and stores a private key for TokA (PrivW-TokA) and communication the corresponding public key (PubW-TokA) to Alice's PC 108a, which receives and stores the public key.

At the end of this activity, the following cryptographic info is available in their respective locations. Alice's PC has a user account key ring, which includes E[RootA]password+clientSalt, {E[RootA]recoveryA+clientSalt}, E[LoginA]password, {E[LoginA]recoveryA}, E[DataProtectionKeyRing]RootA. Alice's PC 108a also includes a data protection key ring, which includes TokA, PubTokA-PC1, PrivTokA-PC1, PubW-TokA Webster's service includes a user record which includes Alice@yahoo.com, E[RootA]password+clientSalt, {E[RootA]recoveryA+clientSalt}, E[LoginA]password, {E[LoginA]recoveryA}, E[TokA]RootA. Webster's service also includes TokA, PubTokA-PC1, PubW-TokA, PrivW-TokA.

At the end of method 1000, cryptographic information is available in each respective location as shown in Table 1.

TABLE 1

| | | Registration Information. |
|---|---|---|
| Alice's PC | User Account Key Ring | E[RootA]password+clientSalt, {E[RootA]recoveryA+clientSalt}, |

TABLE 1-continued

| | | Registration Information. |
|---|---|---|
| | | E[LoginA]password, {E[LoginA]recoveryA}, E[DataProtectionKeyRing]RootA Data Protection Key Ring: TokA, PubTokA-PC1, PrivTokA-PC1, PubW-TokA |
| Webster's Service | User Record | Alice@yahoo.com, E[RootA]password+clientSalt, {E[RootA]recoveryA+clientSalt}, E[LoginA]password, {E[LoginA]recoveryA}, E[TokA]RootA |
| | Token Record | TokA, PubTokA-PC1, PubW-TokA, PrivW-TokA |

FIG. 11 is a schematic transaction flow diagram illustrating one embodiment of a method 1100 for conducting an anonymous and secure transaction with a cloud service 104. In this example, the transaction is storage of an encrypted folder on a cloud storage facility.

In one embodiment, Alice encrypts a folder containing the files through which she wishes to collaborate with Bob. For example, Alice's PC 108a may create a symmetric data encryption key for Folder 1 (DEKA-F1). At transaction 1102, Alice's PC 108a encrypts the folder encryption key and escrows it with Webster's service 106 for subsequent recovery if needed (E[DEKA-F1]RootA).

Webster's service 106 may store the encrypted key and associate it with TokA, for example in a token record generated by record generator 504. In one embodiment, Webster cannot open DEKA-F1 because he does not have RootA.

Alice's PC 108a may then create a symmetric data audit key for Folder 1 (DAKA-F1). At transaction 1104, Alice's PC encrypts the folder audit key and escrows it with Webster's service for subsequent recovery if needed (E[DAKA-F1] RootA). Webster's service 106 stores encrypted key and associates it with TokA. In one embodiment, Webster cannot open DAKA-F1 because he does not have RootA.

Alice may use DEKA-FA to encrypt all the files in Folder 1. In addition, Alice's PC 108a may create an audit event for each operation in Folder 1 and encrypts it using DAKA-F1 (E[{Audit Events-PC1}]DAKA-F1). At transaction 1106, Alice's PC sends E[{Audit Events-PC1}]DAKA-F1 to Webster's service for storage. In so doing, Alice also replaces the file names with a GUID and stores the file names and the key name in meta-data within the file prior to encrypting. Metadata includes the following: (1) TokA, (2) Folder GUID, (3) Key GUID, (4) E[Filename]DEKA-FA, (5) Properties associated with the File, (6) Permissions and rights to be enforced by policy. In one embodiment, the entire meta data bundle may be signed or encrypted to prevent tampering.

At transaction 1108, Alice may sync the contents of Folder1 to the cloud storage location 104 so Bob can access them. In one embodiment, the cloud storage location can be public since the data is encrypted by an encryption key that only Alice can open (DEKA-F1) and that not even Webster can associate with Alice.

At the end of method 1100, cryptographic information is available in each respective location as shown in Table 2.

TABLE 2

| | | Cryptographic Information Available for Protection. |
|---|---|---|
| Alice's PC | User Account Key Ring | E[RootA]password+clientSalt, {E[RootA]recoveryA+clientSalt}, |

TABLE 2-continued

Cryptographic Information Available for Protection.

| | | |
|---|---|---|
| Webster's Service | | E[LoginA]password, {E[LoginA]recoveryA}, E[DataProtectionKeyRing]RootA Data Protection Key Ring: TokA, PrivTokA-PC1, PubW-TokA, DEKA-F1, DAKA-F1 |
| | Audit info | E[{Audit Events-PC1}]DAKA-F1 |
| | User Record | Alice@yahoo.com, E[RootA]password+clientSalt, {E[RootA]recoveryA+clientSalt}, E[LoginA]password, {E[LoginA]recoveryA}, E[TokA]RootA |
| | Token Record | TokA, PubTokA-PC1, PubW-TokA, PrivW-TokA, E[DEKA-F1]RootA, E[DAKA-F1]RootA |
| | Audit Info | F1: TokA: E[{Audit Events-PC1}]DAKA-F1 |

FIG. 12 is a schematic transaction flow diagram illustrating one embodiment of a method 1200 for collaborating in an anonymous and secure transaction with a cloud service 104. In embodiment, Alice invites Bob to collaborate with her on Folder F1's files. For example, at transaction 1202, Alice's PC calls Webster's service 106 to start a collaboration for TokA on F1. At transaction 1204, Webster's service 106 creates a Collaboration Record (CollabTokA-F1) and returns its ID to Alice's PC. At transaction 1206, Alice's PC sends an invitation with the ID of CollabTokA-F1 to Bob's email Bob@gmail.com.

In one embodiment, Alice's PC does not log/audit the association of Bob@gmail.com with CollabTokA-F1. Bob may receive Alice's email and register's with Webster's service at transaction 1208 using the same steps as Alice did in #1 above resulting in the following new cryptographic material in its respective locations:

TABLE 3

Cryptographic Information Available for Collaboration.

| | | |
|---|---|---|
| Bob's PC | User Account Key Ring | E[RootB]password+clientSalt, {E[RootB]recoveryB+clientSalt}, E[LoginB]password, {E[LoginB]recoveryB}, E[DataProtectionKeyRing]RootB Data Protection Key Ring: TokB, PrivTokB-PC2, PubW-Tok |
| | CollabTokA-F1 | CollabTokA-F1 |
| Webster's Service | User Record | Bob@gmail.com, E[RootB]password+clientSalt, {E[RootB]recoveryB+clientSalt}, E[LoginB]password, {E[LoginB]recoveryB}, E[TokB]RootB |
| | Token Record | TokB, PubTokB-PC2, PubW-TokB, PrivW-TokB |

At transaction 1210, Bob's PC 108b notifies Webster's service that Alice's invitation, CollabTokA-F1, is accepted. Webster's service 106 updates the Collaboration Record to include ID: CollabTokA-F1, originator: TokA, content: F1, participant: TokB.

At transaction 1212, Webster's service sends a request to Alice's PC (TokA) to complete the invitation by sending Bob the F1 folder encryption key (DEKA-F1) encrypted by Bob's public key (PubTokB-PC2). Alice's PC 108a may encrypt DEKA-F1 and DAKA-F1 with both Bob's and Webster's public keys as follows: E(E(DEKA-F1)PubTokB-PC2) PubW-TokA, E(E(DAKA-F1)PubTokB-PC2)PubW-TokA. Alice's PC 108a (TokA) may then reply, at transaction 1214, by sending E(E(DEKA-F1)PubTokB-PC2)PubW-TokA and E(E(DAKA-F1)PubTokB-PC2)PubW-TokA to Webster's service.

Webster's service 106 may then unwrap the protected response from TokA using PrivW-TokA leaving E(DEKA-F1)PubTokB-PC2 and E(DAKA-F1)PubTokB-PC2. At transaction 1216, Webster's service sends a request to Bob's PC (TokB) to complete the invitation by sending E(DEKA-F1)PubTokB-PC2 and E(DAKA-F1)PubTokB-PC2 to be used to read data from CollabTokA-F1.

Bob's PC 108b may then unwrap the encryption key for CollabTokA-F1 using PrivTokB-PC2 and adds DEKA-F1 to his Data Protection Key Ring protected by RootB. At transaction 1218, Bob's PC sends Webster's service E[DEKA-F1]RootB, E[DAKA-F1]RootB for TokB recovery purposes. Webster's service 106 stores the keys in TokB's Record. Bob's PC 108b accesses the cloud storage location 104 and syncs the Folder F1 data where it is unlocked and accessed using DEKA-F1 at transaction 1220.

Audit events may be recorded for all activity protected by DAKA-F1. Protected Audit events E[{Audit Events-PC2}] DAKA-F1 may be sent to Webster's service 106 for subsequent retrieval and analysis.

At the end of method 1200, cryptographic information is available in each respective location as shown in Table 4.

TABLE 4

Cryptographic Information Available for Collaboration.

| | | |
|---|---|---|
| Alice's PC | User Account Key Ring | E[RootA]password+clientSalt, {E[RootA]recoveryA+clientSalt}, E[LoginA]password, {E[LoginA]recoveryA}, E[DataProtectionKeyRing]RootA Data Protection Key Ring: TokA, PrivTokA-PC1, PubW-TokA, DEKA-F1, DAKA-F1 |
| | CollabTokA-F1 | ID of DEK: DEKA-F1 ID of AEK: DAKA-F1 Originator: TokA Participant: TokB |
| | Audit Info | E[{Audit Events-PC1}]DAKA-F1 |
| Bob's PC | User Account Key Ring | E[RootA]password+clientSalt, {E[RootA]recoveryA+clientSalt}, E[LoginA]password, {E[LoginA]recoveryA}, E[DataProtectionKeyRing]RootA Data Protection Key Ring: TokA, PrivTokA-PC1, PubW-TokA, DEKA-F1, DAKA-F1 |
| | CollabTokA-F1 | ID of DEK: DEKA-F ID of AEK: DAKA-F Originator: TokA Participant: TokB |
| | Audit Info | E[{Audit Events-PC1}]DAKA-F1 |
| Webster's Service | User Record | Alice@yahoo.com, E[RootA]password+clientSalt, {E[RootA]recoveryA+clientSalt}, E[LoginA]password, {E[LoginA]recoveryA}, E[TokA]RootA Bob@gmail.com, E[RootB]password+clientSalt, {E[RootB]recoveryB+clientSalt}, E[LoginB]password, {E[LoginB]recoveryB}, E[TokB]RootB |
| | Token Record | TokA, PubTokA-PC1, PubW-TokA, PrivW-TokA, E[DEKA-F1]RootA, E[DAKA-F1]RootA TokB, PubTokB-PC2, PubW-TokB, PrivW-TokB, E[DEKA-F1]RootB, E[DAKA-F1]RootB |
| | CollabTokA-F1 | ID of DEK: DEKA-F |

TABLE 4-continued

Cryptographic Information Available for Collaboration.

| | |
|---|---|
| Audit Info | ID of AEK: DAKA-F1<br>Originator: TokA<br>Participant: TokB<br>F1: TokA: E[{Audit Events-PC1}]DAKA-F1<br>F1: TokB: E[{Audit Events-PC2}]DAKA-F1 |

FIG. 13 is a schematic transaction diagram illustrating one embodiment of a method 1300 for recovery of a system for providing anonymous security for a transaction with a cloud service. In one embodiment, Alice recovers access to Collab-TokA-F1 data on PC3 108c if she loses PC1 108a.

At transaction 1302, Alice downloads Webster's client software from Webster's service onto PC3 108c. Alice may enter her email, Alice@yahoo.com and password to log into Webster's client.

At transaction 1304, Alice's PC3 sends a request to Webster's service 106 to download Alice's recovery bundle which includes all the contents of Alice's user record. Webster's service may verify Alice's password using E[LoginA]password. Upon success, Webster's service 106 may send Alice's PC3 108c a reply at transaction 1306 with Alice's User Record as follows: (1) Alice@yahoo.com, (2) E[RootA]password+clientSalt, {E[RootA]recoveryA+clientSalt}, (3) E[LoginA]password, (4) {E[LoginA]recoveryA}, (5) E[TokA]RootA. In one embodiment, a session key and/or nonce are used here to make sure no one else can send a request for TokA's recovery bundle in the next step.

Alice's PC3 108c may then prompt Alice to enter the clientSalt that was sent to her in an email. Alice may enter the clientSalt. Alice's PC3 108c may then unlock RootA which enables it to open TokA.

At transaction 1308, Alice's PC3 sends a request to Webster's service for TokA's recovery bundle using the same session key and server nonce along with a cryptographic nonce. Webster's service 106 verifies the nonce and/or session key and replies, at transaction 1310, with the token record and any collaboration records for TokA, including for the token record: TokA, PubTokA-PC1, PubW-TokA, PrivW-TokA, E[DEKA-F1]RootA, E[DAKA-F1]RootA; and for the collaboration records: CollabTokA-F1, ID of DEK: DEKA-F1, ID of AEK: DAKA-F1, Originator: TokA, Participant: TokB.

In one embodiment, Alice's PC3 108c can now read all data because it can unlock DEKA-F1 and DAKA-F1 with RootA. Alice's PC 108c may then create a private key stored only on her PC, PC3 (PrivTokA-PC3). Webster's service 106 may then receive the corresponding public key (PubTokA-PC3) for TokA at transaction 1312 and stores it associated with TokA.

Alice's PC 108c may then access the cloud storage location 106 at transaction 1314 and sync the Folder F1 data where it is unlocked and accessed using DEKA-F1. Audit events may be recorded for all activity protected by DAKA-F1. In one embodiment, protected Audit events E[{Audit Events-PC3}] DAKA-F1 are sent to Webster's service for subsequent retrieval and analysis.

At the end of method 1300, cryptographic information is available in each respective location as shown in Table 5.

TABLE 5

Cryptographic Information Available for Recovery.

| | | |
|---|---|---|
| Alice's PC | User Account Key Ring | E[RootA]password+clientSalt,<br>{E[RootA]recoveryA+clientSalt},<br>E[LoginA]password,<br>{E[LoginA]recoveryA},<br>E[DataProtectionKeyRing]RootA<br>Data Protection Key Ring: TokA,<br>PrivTokA-PC3, PubW-TokA,<br>DEKA-F1, DAKA-F1 |
| | CollabTokA-F1 | ID of DEK: DEKA-F1<br>ID of AEK: DAKA-F1<br>Originator: TokA<br>Participant: TokB |
| | Audit info | E[{Audit Events-PC3}]DAKA-F1 |
| Bob's PC | User Account Key Ring | E[RootB]password+clientSalt,<br>{E[RootB]recoveryB+clientSalt},<br>E[LoginB]password,<br>{E[LoginB]recoveryB},<br>E[DataProtectionKeyRing]RootB<br>Data Protection Key Ring: TokB,<br>PrivTokB-PC2, PubW-TokB,<br>DEKA-FA, DAKA-F1 |
| | CollabTokA-F1 | ID of DEK: DEKA-F1<br>ID of AEK: DAKA-F1<br>Originator: TokA<br>Participant: TokB |
| | Audit info | E[{Audit Events-PC2}]DAKA-F1 |
| Webster's Service | User Record | Alice@yahoo.com,<br>E[RootA]password+clientSalt,<br>{E[RootA]recoveryA+clientSalt},<br>E[LoginA]password,<br>{E[LoginA]recoveryA}, E[TokA]RootA<br>Bob@gmail.com,<br>E[RootB]password+clientSalt,<br>{E[RootB]recoveryB+clientSalt},<br>E[LoginB]password,<br>{E[LoginB]recoveryB}, E[TokB]RootB |
| | Token Record | TokA, PubTokA-PC1, PubTokA-PC3,<br>PubW-TokA, PrivW-TokA,<br>E[DEKA-F1]RootA, E[DAKA-F1]RootA<br>TokB, PubTokB-PC2, PubW-TokB,<br>PrivW-TokB, E[DEKA-F1]RootB,<br>E[DAKA-F1]RootB |
| | CollabTokA-F1 | ID of DEK: DEKA-F1<br>ID of AEK: DAKA-F1<br>Originator: TokA<br>Participant: TokB |
| | Audit info | F1: TokA: E[{Audit Events-PC1}]DAKA-F1<br>F1: TokB: E[{Audit Events-PC2}]DAKA-F1<br>F1: TokA: E[{Audit Events-PC3}]DAKA-F1 |

FIG. 14 is a schematic transaction diagram illustrating one embodiment of a method 1400 for data deduplication in a system having anonymous security for a transaction with a cloud service 104. In one embodiment, Alice encrypts a folder containing the files through which she wishes to collaborate with Bob while preserving file level data deduplication. In such an embodiment, Alice's PC3 108c creates a symmetric data audit key for Folder 1 (DAKA-F1).

Alice's PC3 108c may then encrypt the folder audit key and escrows it at transaction 1402 with Webster's service for subsequent recovery if needed (E[DAKA-F1]RootA). Webster's service stores encrypted key and associates it with TokA. In one embodiment, Webster cannot open DAKA-F1 because he does not have RootA.

Alice's PC3 108c may then process the files in Folder 1 one at time and for each file computes the file hash, Hash(file). At transactions 1404, Alice requests a file encryption key on behalf of TokA on PC3 for the file whose signature is Hash (file) from Webster's service 106.

Webster's service 106 looks in the File Encryption Key Table, which maps file signatures to symmetric encryption keys (i.e. Hash(File):FileEncryptionKey), to find the encryption key (FEK-file) for Hash(File). Webster's service looks up the TokA record and encrypts the FEK-file with PubTokA-PC3 producing E(FEK-file)PubTokA-PC3 and sends it back to Alice's PC3 108a at transaction 1406.

Alice's PC3 108c uses PrivTokA-PC3 to decrypt E(FEK-file)PubTokA-PC3 producing FEK-file. Alice's PC3 108c encrypts file with FEK-file by first prepending meta-data and then encrypting the whole file. Alice's PC3 108c creates an audit event for each operation in Folder 1 and encrypts it using DAKA-F1 (E[{Audit Events-PC1}]DAKA-F1). Alice's PC sends, at transaction 1408, E[{Audit Events-PC1}]DAKA-F1 to Webster's service for storage. In so doing, Alice also replaces the file names with a GUID and stores the file names and the key name in meta-data within the file prior to encrypting.

Alice syncs the contents of Folder1 to the cloud storage location 104 at transaction 1410 so Bob can access them. In one embodiment, the cloud storage location can be public since the data is encrypted by an encryption key that only Alice can open and that not even Webster can associate with Alice.

According to the described embodiment, Webster returns requests for file encryption keys to those with valid Token Records and encrypted with the Public Key for the requesting PC for the Token. In such an embodiment, Webster may give up the file encryption key table (as in the case of a subpoena) but doing so only gives the attacker the key for files that are already in plaintext (since they must compute the correct hash to find the right key and since filenames are not visible and files are not a standard format there is no way to associate a known file with another file and determine that they are the same file).

At the end of method 1400, cryptographic information is available in each respective location as shown in Table 6.

TABLE 6

Cryptographic Information for data deduplication.

| | | |
|---|---|---|
| Alice's PC | User Account Key Ring | E[RootA]password+clientSalt, {E[RootA]recoveryA+clientSalt}, E[LoginA]password, {E[LoginA]recoveryA}, E[DataProtectionKeyRing]RootA Data Protection Key Ring: TokA, PrivTokA-PC1, PubW-TokA, DAKA-F1, E[{FEK-file}]PrivTokA-PC3 |
| | CollabTokA-F | ID of DEK: DEKA-F1 ID of AEK: DAKA-F1 Originator: TokA Participant: TokB |
| | Audit info | E[{Audit Events-PC3}]DAKA-F1 |
| Bob's PC | User Account Key Ring | E[RootB]password+clientSalt, {E[RootB]recoveryB+clientSalt}, E[LoginB]password, {E[LoginB]recoveryB}, E[DataProtectionKeyRing]RootB Data Protection Key Ring: TokB, PrivTokB-PC2, PubW-TokB, DEKA-FA, DAKA-F1 |
| | CollabTokA-F | ID of DEK: DEKA-F1 ID of AEK: DAKA-F1 Originator: TokA Participant: TokB |
| | Audit info | E[{Audit Events-PC2}]DAKA-F1 |
| Webster's Service | User Record | Alice@yahoo.com, E[RootA]password+clientSalt, {E[RootA]recoveryA+clientSalt}, E[LoginA]password, {E[LoginA]recoveryA}, E[TokA]RootA Bob@gmail.com, E[RootB]password+clientSalt, |

TABLE 6-continued

Cryptographic Information for data deduplication.

| | |
|---|---|
| | {E[RootB]recoveryB+clientSalt}, E[LoginB]password, {E[LoginB]recoveryB}, E[TokB]RootB |
| Token Record | TokA, PubTokA-PC1, PubTokA-PC3, PubW-TokA, PrivW-TokA, E[DEKA-F1]RootA, E[DAKA-F1]RootA TokB, PubTokB-PC2, PubW-TokB, PrivW-TokB, E[DEKA-F1]RootB, E[DAKA-F1]RootB |
| CollabTokA-F | ID of DEK: DEKA-F1 ID of AEK: DAKA-F1 Originator: TokA Participant: TokB |
| Audit Info | F1: TokA: E[{Audit Events-PC1}]DAKA-F1 F1: TokB: E[{Audit Events-PC2}]DAKA-F1 F1: TokA: E[{Audit Events-PC3}]DAKA-F1 |
| File Encryption Table | {File-Hash : File-Encryption-Key} |

In various embodiments described herein, temporary or session keys may be generated for allowing the client 108 to interact on a limited basis with the key broker 106 or with cloud services 104. For example, a single transaction session key may be used to encrypt a single cloud-based message or transfer a single data file or folder.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A method, comprising:
   communicating an anonymizing token to a key broker;
   communicating at least one encryption key associated with the anonymizing token to the key broker;
   conducting a secure anonymous transaction with a cloud service using at least one of the encryption keys associated with the anonymizing token;
   enabling a collaborator to access the cloud service, wherein the collaborator is configured to:
   (a) communicate a second anonymizing token to the key broker;
   (b) communicate at least one encryption key associated with the second anonymizing token to the key broker; and
   (c) conduct a secure anonymous transaction with a cloud service using at least one of the encryption key associated with the second anonymizing token;

communicating a collaboration token between the key broker, the client, and the collaborator;

communicating at least one collaboration key between the key broker, the client, and the collaborator, the at least one collaboration key being associated with the collaboration token; and facilitating collaboration in one or more secure anonymous transactions with the cloud service using the at least one collaboration key associated with the collaboration token.

2. The method of claim 1, wherein conducting a secure anonymous transaction further comprises storing data on a cloud storage facility, the data being encrypted using a data encryption key, the data encryption key being associated with the anonymizing token.

3. The method of claim 1, further comprising recovering the anonymizing token from the key broker, the anonymizing token being recovered using decryption information which is not stored on the key broker.

4. The method of claim 1, further comprising recovering the at least one encryption key from the key broker, the at least one encryption key being recovered using decryption information which is not stored on the key broker.

5. The method of claim 1, further comprising deduplicating redundant data associated with the cloud service, wherein redundancy of the data is determined, at least in part, in response to the anonymizing token.

6. The method of claim 1, further comprising communicating, to the key broker, one or more audit keys for the secure anonymous transaction, the one or more audit keys being associated with the anonymizing token.

7. A memory device comprising computer-executable code stored thereon that, when executed by a data processing device, causes data processing device to:
receive an anonymizing token from a client;
communicate an anonymizing token to a key broker;
receive one or more encryption keys associated with the anonymizing token; and
communicate at least one encryption key associated with the anonymizing token to the key broker;
facilitate a secure anonymous transaction with a cloud service using at least one of the encryption keys associated with the anonymizing token
enabling a collaborator to access the cloud service, wherein enabling comprises:
(a) receiving a second anonymizing token from a second client;
(b) generating a second record associated with the second anonymizing token;
(c) receiving at least one encryption key associated with the second anonymizing token from the second client;
(d) storing the one or more encryption keys associated with the second anonymizing token in the second record; and
(e) facilitating communication of one or more collaboration keys from the first client to the second client
communicating a collaboration token between the key broker, the client, and the collaborator;
communicating at least one collaboration key between the key broker, the client, and the collaborator, the at least one collaboration key being associated with the collaboration token; and
facilitating collaboration in one or more secure anonymous transactions with the cloud service using the at least one collaboration key associated with the collaboration token.

8. The memory device of claim 7, further comprising generating one or more encryption keys and associating the one or more encryption keys with the anonymizing token in the record associated with the anonymizing token.

9. The memory device of claim 7, further comprising providing recovery services to the client for recovering the anonymizing token, the anonymizing token being recovered using decryption information which is not stored on the key broker.

10. The memory device of claim 7, further comprising providing recovery services to the client for recovering the at least one encryption key from the key broker, the at least one encryption key being recovered using decryption information which is not stored on the key broker.

11. The memory device of claim 7, further comprising protecting redundant data associated with the cloud service in a way that protected data can be deduplicated, wherein redundancy of the data is determined, at least in part, in response to the anonymizing token.

12. The memory device of claim 7, further comprising receiving one or more audit keys for the secure anonymous transaction, and storing the one or more audit keys in association with the anonymizing token.

13. A system, comprising:
a reseller service provider system configured to:
receive an anonymizing token from a client;
communicate an anonymizing token to a key broker;
receive one or more encryption keys associated with the anonymizing token; and
communicate at least one encryption key associated with the anonymizing token to the key broker;
facilitate a secure anonymous transaction with a cloud service using at least one of the encryption keys associated with the anonymizing token; and
enable a collaborator to access the cloud service, wherein enabling comprises:
(a) receiving a second anonymizing token from a second client;
(b) generating a second record associated with the second anonymizing token;
(c) receiving at least one encryption key associated with the second anonymizing token form the second client;
(d) storing the one or more encryption keys associated with the second anonymizing token in the second record; and
(e) facilitating communication of one or more collaboration keys from the first client to the second client;
communicate a collaboration token between the key broker, the client, and the collaborator;
communicate at least one collaboration key between the key broker, the client, and the collaborator, the at least one collaboration key being associated with the collaboration token; and
facilitate collaboration in one or more secure anonymous transactions with the cloud service using the at least one collaboration key associated with the collaboration token.

14. The system of claim 13, wherein the reseller service provider system is configured to facilitate a predetermined number of transactions between the client and the cloud service.

* * * * *